May 23, 1961  R. D. GUSTAFSON  2,985,141
HIGH PERFORMANCE HYDRAULIC SERVO VALVE
Filed Nov. 14, 1958  3 Sheets-Sheet 1

INVENTOR.
Robert D. Gustafson
BY
Lindberg & Bradway

United States Patent Office 2,985,141
Patented May 23, 1961

2,985,141

HIGH PERFORMANCE HYDRAULIC SERVO VALVE

Robert D. Gustafson, 698 S. York St., Elmhurst, Ill.

Filed Nov. 14, 1958, Ser. No. 774,577

14 Claims. (Cl. 121—38)

This invention is directed to servo systems using an electrically actuated control valve for delivering fluid to an actuator.

A major purpose of the present invention is to provide a control valve for a servo system which is economically manufactured while retaining high accuracy and sensitivity in its controlling functions.

Another purpose is to create a control valve having a minimum of frictional resistance between its relatively movable working elements.

Another purpose is to provide a servo valve which is not especially sensitive to "dirty" hydraulic fluid.

Another purpose is to provide an improved hydraulic actuator which can be economically manufactured and which has a minimum of friction between working elements of the actuator.

Other purposes will appear from time to time in the course of the ensuing specification and claims.

Referring generally now to the drawings.

Like elements are designated by like characters throughout the specification and drawings.

Figure 1:
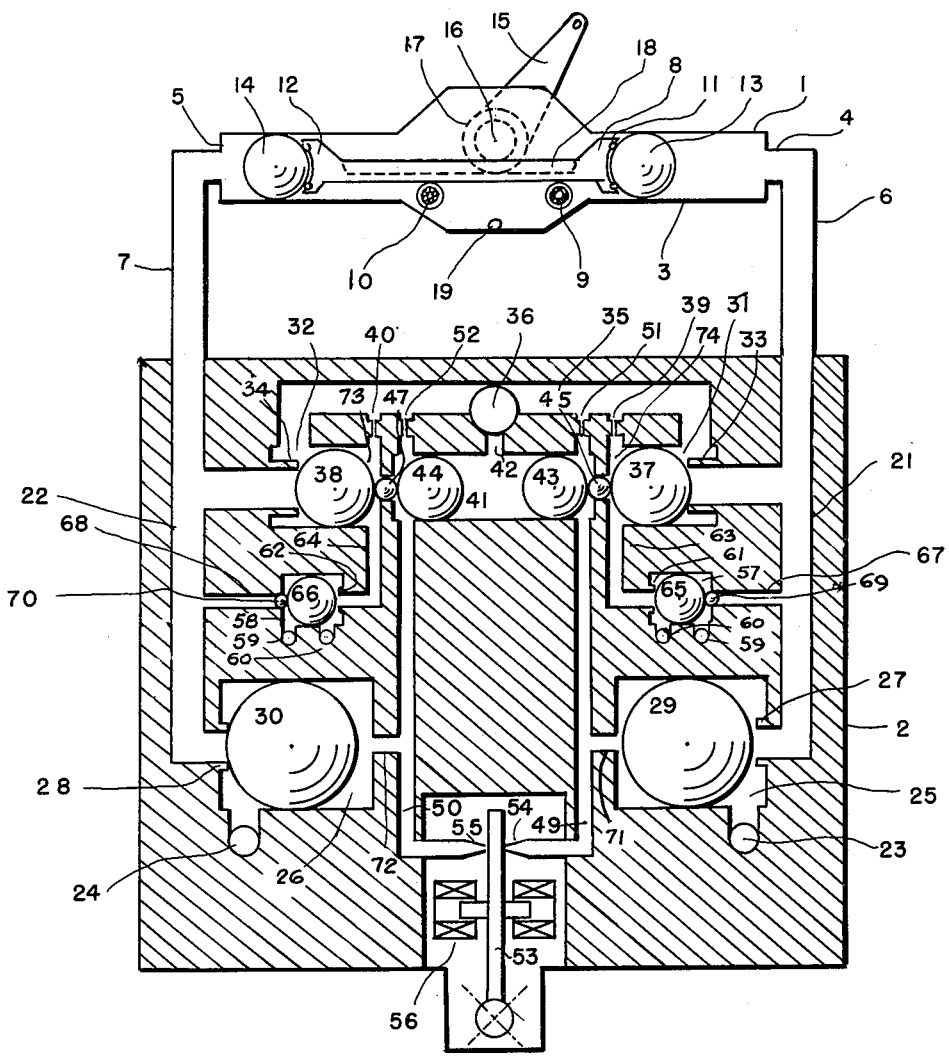
Figure 1 is a sectional illustration of the servo actuator and valve constituting the present invention.

Referring specifically now to the drawings, and in the first instance to Figure 1, 1 designates a servo actuator which is associated with a control valve 2. The actuator may include a cylinder 3 having ports 4 and 5 at opposite ends thereof for admitting hydraulic fluid under pressure to the ends of the cylinder. Hydraulic fluid under pressure may be supplied to the cylinder through the conduits diagrammatically represented at 6 and 7. The actuator includes an elongated member 8 which is supported for movement along the central longitudinal axis of the cylinder as by means of the roller or ball bearings 9 and 10. The member 8 carries a segmental bearing at each end thereof as designated at 11 and 12. The bearing cages 11 and 12 are adapted for rolling engagement with balls 13 and 14, which are positioned outwardly of the bearing cages 11 and 12. The diameter of the balls 13 and 14 is generally equal to that of the ends of the cylinder 3 so that upon application of hydraulic fluid to a selected end of the cylinder, the pressure of the fluid will force the ball against the associated bearing cage and cause rectilinear movement of the member 8 in the cylinder while exhausting fluid from the opposite end of the cylinder.

A crank 15 is mounted for rotation in the central portion of the cylinder and may include a shaft 16 projected into the cylinder and having a pinion gear 17 engageable with gear rack 18 on the member 8. Thus motion of the member 8 is transmitted into angular motion of the crank 15 and angular motion of the crank 15 is converted into rectilinear motion of the elongated member 18.

The intermediate portion of the cylinder may include a drain port which is diagrammatically represented at 19 and which acts to drain off any excess fluid accumulated in the cylinder between the actuating balls 13 and 14. It should be understood that there is a small clearance between the surface of the balls 13 and 14 and the inner circumferential wall of the cylinder so that a fluid film may exist between the balls and the walls of the cylinder. This fluid film tends to reduce the friction of the piston structure which includes the balls 13 and 14 and movable member 18.

The valve body 2 includes a control section communicating with the conduit 6 and the control communication connecting with the control conduit 7. The valve body may include, for example, an elongated fluid supply and return passageway 21 on one side of the body and an elongated fluid supply and return passageway 22 on the other side of the body. The passageways 21 and 22 are adapted to deliver fluid under pressure to the connected conduits 6 and 7, respectively, to thus selectively move the output crank 15 in one direction or the other. Each of the passageways 21 and 22 communicates with a drain port 23 and 24, respectively, through drain chambers 25 and 26. The drain chambers have nozzles 27 and 28, communicating with the passageways 21 and 22. These nozzles 27 and 28 project into the end of the chambers and are adapted, at certain periods of operation of the valve, to be sealed off by spherical closing members 29 and 30, respectively, in a manner to be more fully described in ensuing portions of this specification.

Control chambers 31 and 32 selectively deliver fluid under pressure to the passageways 21 and 22, respectively. Each of the chambers 31 and 32 includes a nozzle 33 and 34, respectively, which projects from the end wall of the chamber. The orifices through the nozzles are in communication with the respective passageways 21 and 22. The same end of the chambers 31 and 32 is supplied with hydraulic fluid under pressure from a passageway 35 which is supplied with hydraulic fluid under pressure from a supply port 36.

It should be understood that a suitable hydraulic fluid pump may be associated with the supply port 36 in order to deliver fluid under pressure to the ends of the chambers 31 and 32.

Each of the nozzles 33 and 34 are adapted to be closed, from time to time, during operation of the valve by means of spherical nozzle closing members 37 and 38 respectively, which are of greater diameter than the nozzles and which have diameters corresponding generally to the diameters of the chambers 31 and 32.

Bleed ports 39 and 40 are adapted to admit the supply pressure from the passageway 35 to the chambers 31 and 32 between the members 37 and 38 and the ends of the chambers, opposite from the nozzle ends. The fluid from the bleed ports has no appreciable effect on the balls 37 and 38. These ports are for a purpose pointed out in the following portions of this specification.

In order to selectively control the seating of the members 37 and 38 against the nozzles 33 and 34, respectively, and unseat these members from time to time so as to allow delivery of the fluid supply through a selected nozzle and to one end of the actuator, a variable pressure system is provided for balancing the forces on the members 37 and 38. This includes a pressure balancing chamber 41 which, in the embodiment shown, is axially aligned with the chambers 31 and 32, and communicates with the supply port 42. The chamber 41 is of a smaller diameter than that of the chambers 31 and 32 and has spherical members 43 and 44 which transmit force through intermediate balls or spherical members to the members 37 and 38. The intermediate members 45 and 47 are of a different size than the members 37, 38, 43 and 44 and as shown in Fig. 1, are adapted for continuous rolling contact with the associated members 37, 43 and 38, 44, respectively.

Suitable means may be provided for preventing movement of the intermediate balls completely out of their bores in the housing. If desired, the chamber 41 may be made as two chambers, each of such length as to limit movement of the balls 43 and 44 to such an extent that removal of the intermediate balls is prevented.

The cross sectional areas of the balls 43 and 44 are preferably equal to the difference between the cross sectional area of the ball 37 or 38 and the cross sectional area of the nozzle 33 or 34, so that the pressure in the chamber 41 balances the pressure at the nozzle ends of the chambers 31 and 33, when the balls 37 and 38 are seated against the nozzles.

In order to selectively vary the pressure exerted on the ball closing members 37 and 38, a control passageway is provided at each end of the chamber 41. Thus a passageway 49 may be provided for the right hand end of the chamber 41 and a passageway 50 may be provided for the left hand end of the chamber 41. The passageways 49 and 50 receive fluid under pressure from a source of supply through restricted bleed ports 51 and 52, respectively, which deliver fluid under pressure to the opposite ends of the chamber 41 and between the balls 43 and 44 and the intermediate balls. The ports 51 and 52 may be of the same general size as the bleed ports 39 and 40. Thus the control pressure through the passageways 49 and 50 exerts forces tending to move the balls 43 and 44 toward one another, or in nozzle opening directions. By varying the pressure in one or the other of the passageways 49 and 50, the total forces exerted on the nozzle closing balls 37 or 38 is varied and in a manner such as to either open one of the nozzles 33 and 34 respectively, or close it in accordance with the variations in the control pressure.

Various means may be provided for varying the control pressure in the passageways 49 and 50. In the embodiment of the invention illustrated in the drawings, the control pressure is illustrated as controlled by a flapper 53 which is movable toward either one or the other of jets 54 and 55 which are in communication respectively with the control pressure passages 49 and 50. When the flapper 53 is in the intermediate position illustrated in Fig. 1, the resistance offered by the flapper to the fluid pressure from the jets 54 and 55 is equal and the control pressures in the passageways 49 and 50 will tend to be equal. If the flapper 53 is moved toward one of the jets 54 and 55, this causes a greater resistance against this jet and a lesser resistance against the other with the result that the control pressure builds up in the passage leading to this jet and drops in the other.

Movement of the flapper 53 may be under control of an electro-magnetic control system generally designated at 56. It should be understood that control pressure jets, flappers, and electro-magnetic actuators of this general class are old in themselves, and for this reason the system is diagrammatically illustrated in the drawings. This type of system may be utilized to cause movement of the flapper in one direction or the other and cause attendant delivery of fluid under pressure to one end or the other of the actuator.

Means may be provided for feeding back pressure delivered through either one or the other of the nozzles 33 or 34 to the nozzle member 37 and 38 in directions tending to close the members 37 and 38 against their respective nozzles. Feed back chambers 57 and 58 are provided for the respective control chambers 31 and 32. The feed back chambers include drain ports 59 and 60 at opposite ends of these chambers. One end of each feed back chamber includes a nozzle 61 or 62, respectively, which project into ends of the chambers and which communicate through passageways 63 and 64 with the ends of the control chambers 31 and 32 opposite to the nozzle ends of these chambers. Thus the passageways 63 and 64 are in communication with the ends of the control chambers communicating with the restricted bleed passages 39 and 40, respectively. The feed back chambers may, if desired, include nozzle closing balls 65 and 66, respectively, of greater diameter than the diameter of the nozzles in the chambers, and adapted to move toward the nozzles and regulate the pressure in the passage leading to the nozzle. The ends of the chambers opposite to the nozzle ends have passages 67 and 68 communicating with the output pressure passageways 21 and 22 respectively. A small ball 69 and 70 is positioned for rolling movement in these respective passages 67 and 68 and substantially fills these passages so as to substantially preclude the passage of fluid therethrough. The small balls 69 and 70 are thus subjected to the pressure in the passages 21 and 22. The area of the balls of the passageways 67 and 68 is smaller than the inlet area of the nozzles 61 and 62, however, so that the force directed against the balls 65 and 66 is the same as the opposite force exerted on the balls 65 and 66 through the nozzles 61 and 62. The area of the nozzles should be larger than the area of the balls 69 and 70 by the same proportion that the pressure in passages 21 and 22 bears to the pressure developed in the passages 63 and 64.

It should be understood that the spacing of the balls 65 and 66 from the nozzles 61 and 62 in Fig. 1 is greater than that found in actual practice, the purpose of such being to clearly illustrate the opening effects of the balls 65 and 66. In actual practice the chambers 57 and 58 and nozzles are of such a length that the balls 65 and 66 are limited in movement to a distance generally equal to ½ the diameter of the small balls 69 and 70 so that these small balls 69 and 70 are retained in their respective passageways.

When pressure builds up in one or the other of the supply passageways 21 or 22, as when a load on the actuator slightly moves its piston in one direction or when fluid leakage past the balls 37 or 38 tends to build up the pressure when a static condition of the load is intended, the pressure accordingly builds up in the passages 67 or 68, as the case may be, to exert a greater nozzle closing force on the feed back passages. When the pressure builds up, the ball 65 or 66 is moved closer to its nozzle with the result that the pressure of the fluid bleeding through the passageway 39 or 40 builds up in the chamber 73 or 74, respectively, and thus increases the force tending to seat the ball 37 or 38 against its associated nozzle and restores the balanced or static condition of the valve actuator.

Drain chambers 25 and 26 each communicate with the control pressure passageways 49 and 50 through the ports 71 and 72 so that the control pressure enters the drain chambers 25 and 26, respectively, and tends to force the balls 29 and 30 against their respective nozzles 27 and 28. The area of the nozzles 27 and 28 is much smaller than the cross sectional area of the balls 29 and 30 and may be in the same proportion as the "gain ratio" or the ratio of the control pressure to the output pressure. Normally, the control pressure in the passageways 49 and 50 will force the balls 29 and 30 against the respective nozzles 27 and 28 and thus close off the passages 21 and 22 to the drain ports 23 and 24 while the pressure builds up in the passages 21 or 22.

In use, movement of the flapper 53 toward one jet, for example the jet 55, as by means of variation in a control signal supplied to the electro-magnetic actuator 56, will build up the control pressure in the passage 50 and increase the force acting to force the ball 44 to the right. The null point value of the control pressure may be such, in relation to the opposing pressure forces on the balls 38 and 44 and the pressure in the chamber at the bleed port end thereof communicating with nozzle 62, that the total force tending to move the ball 38 against nozzle 34 is equal to the total force in opposition. Then when the control pressure increases, the nozzle opening force exerted on the left side of ball 44 increases and the total nozzle opening forces are then greater than the closing forces. The ball 38 is then moved away from the nozzle 34 and the supply pressure fluid flows to the left hand end of the actuator causing movement of its piston structure to the right. Any fluid in the conduit 6 drains off through the drain 23.

It should be noted that when the pressure in control passage 50 is increased, the pressure in control passage 49 is correspondingly decreased, thus increasing the nozzle closing force on ball 37 while decreasing the drain port closing force on ball 29. Thus, when the actuating member 18 moves to the right, the nozzle 33 is tightly closed while nozzle 27 is open to the drain.

Various combinations of ball and nozzle sizes are possible, depending upon the ratio of the control pressure variation required to open the valve and output pressure desired in the system. If it is desired, for example, to have a ratio of 1 to 16, the balls 37 and 38 may have areas of 49 square millimeters, the nozzles 33 and 34 areas of 13 square millimeters, the balls 43 and 44 areas of 36 square millimeters and the intermediate balls areas of 4 square millimeters. The control pressure may be maintained at a null point value such as to balance the forces on the string of balls. The areas of the balls 29 and 30 may then be 144 square millimeters and the areas of the nozzles 27 and 28, 9 square millimeters, so that the nozzles 27 and 28 are closed as long as the ratio of the output pressure to the control pressure is less than 16 to 1 and opened when the ratio is greater than 16 to 1.

Movement of the flapper toward jet 55 increases the pressure in the control passage sufficiently to shift the balls 38 and 44 and intermediate ball to the right thus opening the nozzle 34. The balls stay in engagement with one another. When the flapper returns to the neutral position the pressure in the control passage 50 drops to the null point value, while the pressure in the other control passage 49 increases to the null point value. The result is to close drain chamber 25 and close ball 38 against nozzle 34. With both nozzles 33 and 34 closed, the load represented by the lever 15 is stationary.

The null point value of the control pressure should be such that the product of this pressure and the area of ball 43 or 44 is substantially equal to the product of the pressure in the passages 63 or 64 (in the balanced condition of the valve) and the area of ball 37 or 38, in order that the nozzles 33 and 34 will be closed at the null point value.

Figure 2:
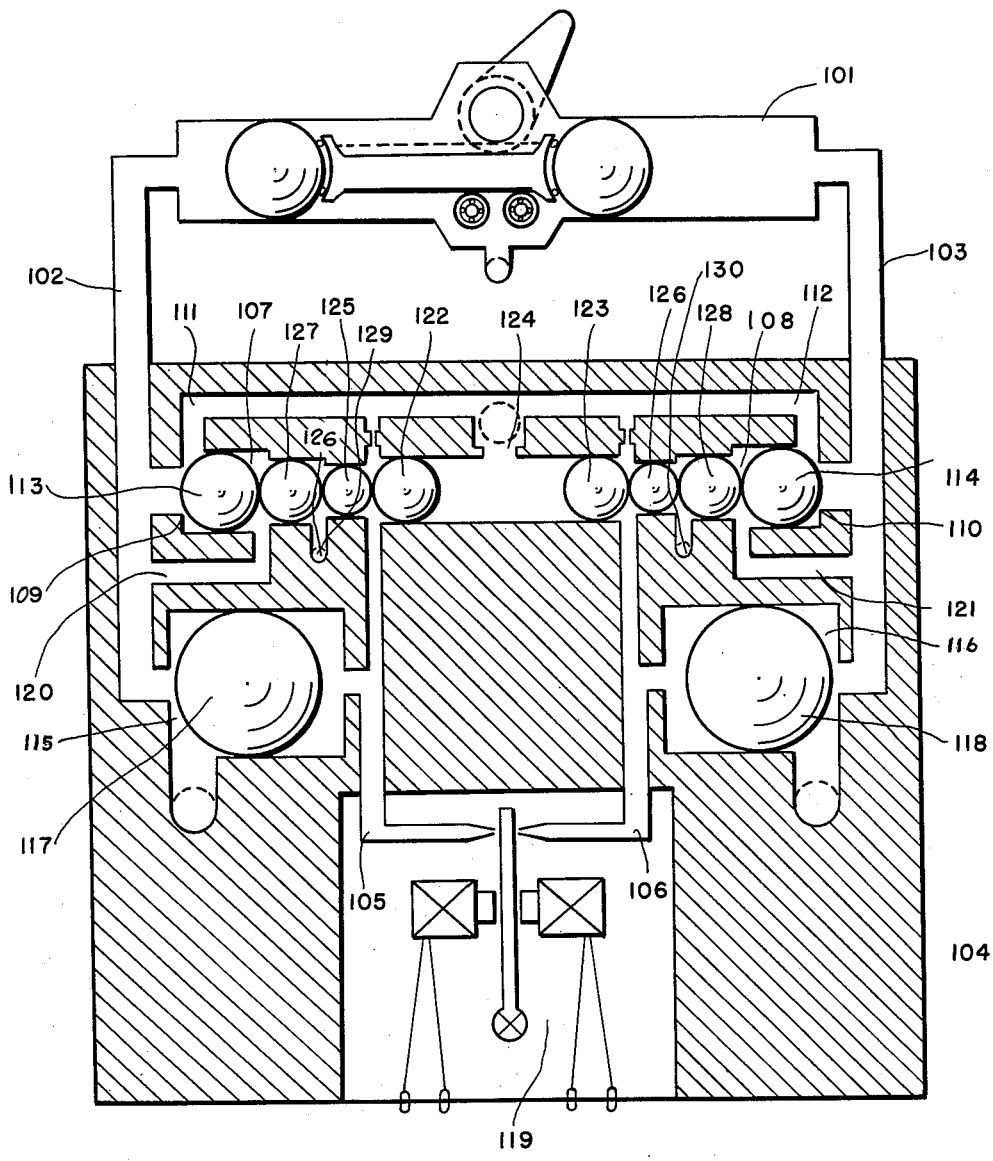
Figure 2 is a sectional illustration of another embodiment of the invention.

Figure 2 illustrates a further embodiment of the invention. In this figure an hydraulic actuator 101 is similar to the actuator of Figure 1 and is controlled by the selective application of hydraulic fluid through conduits 102 and 103. Fluid flow through these conduits is controlled by a valve body 104, which employs control pressure passages 105 and 106 for controlling the opening and closing of the control chambers 107 and 108 to the conduits 102 and 103, respectively.

In this form of the invention, the control chambers have orifices 109 and 110 flush with the end walls of the chambers and leading to the conduits 102 and 103 respectively. These orifices are selectively opened and closed to supply pressure passages 111 and 112 by spherical members 113 and 114 which are adapted to seat against the orifices 109 and 110, respectively.

Drain chambers 115 and 116 are provided with spherical closing members 117 and 118 and cooperate with the supply pressure passages 102 and 103 and control pressure passages 105 and 106 in the same manner as the drain chambers of Figure 1.

The pressure in the control passages 105 and 106 may be selectively varied by an electromagnetically actuated flapper 119 in the same manner as the valve of Figure 1.

In this form of the invention, feed back passages 120 and 121 communicate with the ends of the control chambers opposite to the orifice ends and deliver fluid under the same pressure as that developed in the conduits 102 and 103 against the members 113 and 114 in an orifice closing direction, without the feed back regulating members illustrated in Figure 1.

The valve piston structure of Figure 2 includes a string of four spherical members adapted for engagement with one another and adapted to move together as a unit in opening and closing the control chambers. The end members 122 and 123 are, as in the case of the members 43 of Figure 1, of a cross sectional area equal to the difference in cross sectional area of the orifices 109 and 110 and the members 113 and 114. The members 122 and 123 are subjected to the supply pressure from a chamber 124 in a direction such as to exert an orifice closing force on their associated members 113 and 114, respectively. The members 122 and 123 are also subjected to the control pressure in passages 105 and 106, respectively, so that the control pressure exerts forces on these members in orifice opening directions.

An intermediate ball 125 is in engagement with ball 122 while an intermediate ball 126 is in engagement with the ball 123. The balls 125 and 126 are subjected to the control pressure in their associated passageways 105 and 106 so that the control pressure exerted thereagainst exerts an orifice closing force on the balls 113 and 114 respectively. Intermediate balls 127 and 128 are between the balls 113 and 125 and the balls 114 and 126, respectively.

The balls 127 and 128 should be slightly smaller than their associated members 122 and 123 while the balls 125 and 126 should be the smallest of the group. The precise sizes may be determined in accordance with the gain ratio desired in the valve.

Drain chambers 129 and 130 are positioned to drain off fluid leaking past the balls 125 and 127 and the balls 126 and 128, respectively.

The operation of the valve of Figure 2 is similar to that of the valve of Figure 1. The valve maintains a static condition of the load as long as the control pressure is balanced on both sides of the valve and delivers fluid from the source to one side or the other of the actuator in accordance with control pressure variations.

Figure 3:
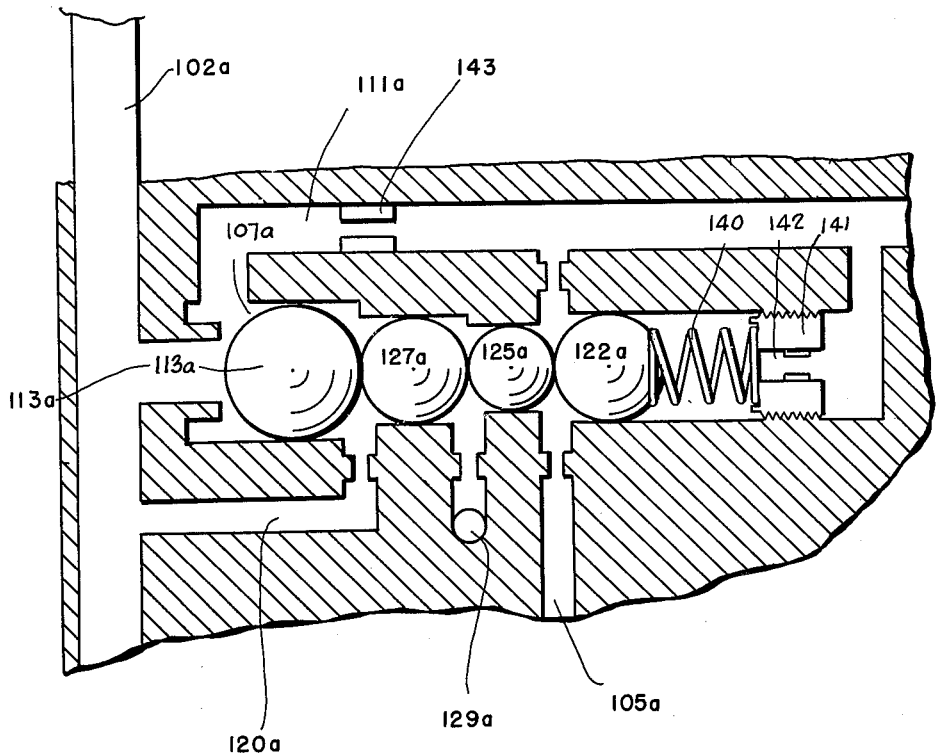
Figure 3 is an enlarged sectional illustration showing a variation that may be employed.

Figure 3 illustrates a control valve similar to that illustrated in Figure 2. In this embodiment, the valve piston structure and passage arrangement is similar to that of Figure 2 and for this reason corresponding elements carry the same numbers as the elements in Figure 2 but with the addition of the suffix "a."

In this embodiment, an adjustable coiled spring 140 biases the ball 122a in a nozzle closing direction. The spring may exert no significant force on the ball 122a when the ball is at its extreme left position, as when ball 113a closes its orifice or nozzle. The spring tends to limit opening movement of the balls to a small distance. One end of the spring may bear against the ball 122a while the other end bears against an adjustable nut 141 which is adjustably threaded in the chamber in which ball 122a is located. The nut 141 may have a restricted orifice 142 therethrough.

The use of the restricted orifice slows down the closing action of the valve when the control pressure drops.

A restricted orifice 143 may be provided in the supply pressure passage 111a leading to the nozzle end of chamber 107a so as to slow down the flow of hydraulic fluid to this end of the chamber.

Either one or both of the restricted orifices 143 or 142 may be used, if desired.

It should be understood that, if desired, adjustable needle valves may be provided for the various restricted orifices of the embodiments of Figures 1, 2 or 3 so that the user may selectively adjust the flow of fluid through these orifices in order to obtain optimum regulating characteristics of the valve for any particular use thereof.

It should also be understood that whereas the valves illustrated herein are shown as taking the form of a single valve body with the various passages formed therein, this showing in this form is for ease in understanding the operation of the valve and should be taken in a diagrammatic or illustrative sense. The valves, as produced for use, may take the form of several distinct bodies with a control chamber and drain chamber in each body and with conduits or ducts interconnecting the chambers in the same functional relation illustrated by the chambers and passages shown herein. If it is desired to form the valve in a single body, the various passages may be formed by tapping holes in the body corresponding to the positions of the passages, plugging the ends of the holes and using inserts to provide various diameters of the holes for the purposes described herein. Such fabricating operations are well known to those skilled in the valve art.

In all forms of the invention, the valve may be delicately balanced with the control chamber opening forces balancing the closing forces on both sides of the valve during the neutral position of the flapper. At the same time any tendency of the load to "creep" and cause movement of the actuator when a static condition is desired is firmly opposed by the sealing of the drain chambers and the pressure build up in the feed back passages which increase the orifice closing forces in the control chambers under this condition.

The use of the spherical members in the system reduces friction in the system and minimizes the need for close tolerances. The balls tend to center themselves along the longitudinal axis of the chambers so that a thin fluid film may exist between the balls and the chambers. Moreover, the use of the spherical shape enables a tight sealing engagement at the nozzles or orifices, the members tending naturally to align themselves along the axis of their associated nozzles.

Whereas I have shown and described an operative form of the invention, I wish it to be understood that this showing and description thereof should be taken in an illustrative or diagrammatic sense only and not in any limiting sense. There are modifications to the invention which will fall within the scope and spirit thereof and which will be apparent to those skilled in the art. The scope of the invention should be limited only by the scope of the hereinafter appended claims.

I claim:

1. In a servo system of the type including a fluid actuator, a source of fluid pressure and a valve in a line of communication between said source and said fluid actuator, the improvement comprising a valve including a chamber having a movable valve member therein and an orifice in one end of said chamber, said orifice being in communication with said actuator, said movable valve member adapted to seat against said orifice and close the passageway through said orifice to communication with said chamber, said valve member being subjected to the pressure between the actuator and valve through said orifice, means delivering fluid under pressure from said source to said chamber at one end thereof adjacent said orifice so as to supply a valve opening force to said valve member, means opposing the force of said first named pressure including means delivering fluid from said source in a direction such as to bias said valve member into closing engagement with said orifice and means delivering a variable control pressure force to said member, whereby at one value of said control pressure said valve member seats against said orifice and at other values of said control pressure the net closing force exerted on said valve member is above or below that amount to allow said valve member to move away from said orifice and allow communication between said source of supply and said actuator or hold said valve member closed in accordance with the summation of forces on said member.

2. In a servo valve, a fluid chamber and an orifice opening into said chamber at one end thereof, a passageway leading away from a source of fluid supply to said end of said chamber, and a movable valve member in said chamber, said movable valve member being subjected to the pressure of the fluid delivered through said passageway while being adapted to seat against and close said orifice, and means providing a continuous and variant control pressure to the other end of said valve member.

3. The structure of claim 2 wherein said valve member is in the form of a ball positioned in said chamber and adapted to seat against said orifice.

4. The structure of claim 2 wherein said means providing a continuous and variant control pressure includes a second movable member subjected to the pressure from said source of supply and in pressure transmitting relation with said first member, the direction of force applied to said second member being opposite to the passageway fluid pressure applied to said first member and being projected over an area of said second member sufficient to force said first member against said orifice, and means providing a variant control pressure exerting a variable force on said second member in the opposite direction to thereby open the nozzle to said passageway in accordance with the amount of the control pressure.

5. In a servo valve, a valve body having a chamber therein with an orifice at one end thereof, a spherical valve closing member movable in said chamber and adapted to seat against said orifice, means admitting a supply pressure to the chamber between said member and said orifice, to thereby exert an opening force on said member, means providing a variable and continuous opposing pressure force to the opposite side of said member, one value of said force being of such a magnitude that said member is forced against said orifice to close it, and control means for diminishing said opposing pressure force to thereby allow said member to move away from said orifice and thereby admit said supply pressure through said orifice.

6. A servo valve including a valve body having a generally cylindrical chamber therein, a nozzle projecting into said chamber from one end wall thereof, said nozzle being in communication with an actuator, a valve closing ball in said chamber and adapted to seat against said nozzle, said nozzle having a smaller diameter than said ball and chamber, said ball being subjected to the pressure between the actuator and valve through said orifice, a supply pressure port opening into said chamber at the end of said chamber having said nozzle to thereby bias said ball away from said nozzle, and means exerting a variable nozzle closing force on said ball.

7. In a servo valve, a valve body having a pair of fluid delivery and return passages and a control pressure passage for each fluid delivery passage, means for increasing pressure in one control passage while decreasing the pressure in the other control passage, means responsive to an increase in pressure in each control passage for delivering fluid under pressure from a source of supply to the fluid delivery passage associated with each control passage, a drain chamber in communication with each fluid delivery passage, and means closing each said drain chamber to communication with its fluid delivery passage in response to an increase in pressure in its associated control pressure passage while opening said drain chamber in response to a decrease in pressure in its associated control pressure passage.

8. In a servo valve, a valve body having a pair of fluid delivery and return passages and a control pressure passage for each fluid delivery passage, means for increasing pressure in one control passage while decreasing the pressure in the other control passage, means responsive to an increase in pressure in each control passage for delivering fluid under pressure from a source of supply to the fluid delivery passage associated with each control passage, a drain chamber in communication with each fluid delivery passage, each chamber having a port opening to its associated delivery passage and a spherical member subjected to the pressure from said port while adapted to seat against said port, each chamber having a second port in communication with its associated control pressure passage and admitting fluid from the control pressure passage in a direction such as to seat said member against said port, the cross sectional area of said chamber and said member being greater than the cross sectional area of said port, a decrease in pressure in the control passage allowing said member to move away from said port.

9. In a servo valve, a valve body having a pair of fluid delivery and return passages and a control pressure passage for each delivery passage, means for increasing pressure in one control pressure passage while decreasing the pressure in the other passage, a control chamber for each associated delivery passage and control pressure passage, said control chamber having a first port leading to the delivery passage and a second port for delivering fluid from a pressure source at one end of the chamber, a movable pressure responsive member in said chamber and adapted to seat against and close said first port in opposition to the pressure of the fluid from said second port, and means for moving said member toward and away from said first port including a second pressure responsive member, said second member being subjected to the pressure from said source so as to bias said second member in one direction and subjected to the pressure in the associated control passageway so as to bias said second member in the opposite direction, and means transmitting movement of said second member to said first member.

10. The structure of claim 9 characterized by and including a third port admitting fluid from said source to the other end of said control chamber with a reduction in pressure, said second member having a pressure responsive cross sectional area smaller than the pressure responsive cross sectional area of said first member.

11. In a servo valve, a valve body having a control chamber with an orifice at one end thereof leading to a fluid delivery passageway, a first ball having a diameter corresponding generally to the diameter of the chamber and adapted to seat against said orifice and close it, means admitting fluid under pressure from a source at the orifice end of said chamber so that the fluid exerts pressure on said ball in one direction, means providing fluid under a reduced pressure at the other end of said chamber to bias said ball in the opposite direction, a balancing chamber aligned with said first chamber and a second ball therein, an intermediate pressure transmitting ball in rolling contact with said first and second balls, means delivering a variable control pressure against said second ball in said one direction, and means delivering fluid under pressure from said source against said second ball in said opposite direction.

12. The structure of claim 11 wherein said second ball and chamber having smaller diameters than said first ball and chamber and said intermediate ball is smaller than said second ball.

13. A valve and valve closing and opening piston structure therefor including a valve body having a piston structure therein for opening and closing a pressure delivery passage, said piston structure including a plurality of balls supported for movement along an axis and adapted for rolling movement, and variable pressure means directed against the surfaces of said balls for shifting them along said axis while maintaining rolling engagement of said balls.

14. A servo system including a fluid actuator having a movable member therein such that the fluid pressure in a fluid delivery line from a control valve causes movement of said member, said control valve including a chamber having a movable valve member therein and an orifice in one end of said chamber, said chamber being in communication with said line and said actuator through said orifice, said valve member being adapted to seat against said orifice, means for delivering fluid under pressure from a source to said chamber at the end of said chamber adjacent to said orifice so as to direct a valve opening force against said valve member, said valve member being subjected to the pressure between the actuator and valve through said orifice whereby the pressure between the actuator and valve tends to shift said valve member away from said orifice, means responsive to the pressure between said actuator and said valve for regulating a valve closing force on said valve member, and control means for delivering a variable closing force on said valve member.

References Cited in the file of this patent

UNITED STATES PATENTS

| | | |
|---|---|---|
| 641,009 | Gulland | Jan. 9, 1900 |
| 2,709,063 | Andersen | May 24, 1955 |
| 2,800,143 | Keller | July 23, 1957 |
| 2,824,574 | Place | Feb. 25, 1958 |
| 2,835,265 | Brandstadter | May 20, 1958 |
| 2,870,744 | Hallerstrom | Jan. 27, 1959 |
| 2,876,744 | Yuhaniak | Mar. 10, 1959 |
| 2,887,125 | Lucien | May 19, 1959 |